US009083693B2

(12) United States Patent
Sun

(10) Patent No.: US 9,083,693 B2
(45) Date of Patent: Jul. 14, 2015

(54) MANAGING PRIVATE INFORMATION IN INSTANT MESSAGING

(71) Applicant: Xiao Sun, Shenzhen (CN)

(72) Inventor: Xiao Sun, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 102 days.

(21) Appl. No.: 13/993,032

(22) PCT Filed: Apr. 27, 2013

(86) PCT No.: PCT/CN2013/074868
§ 371 (c)(1),
(2) Date: Jun. 10, 2013

(87) PCT Pub. No.: WO2014/172909
PCT Pub. Date: Oct. 30, 2014

(65) Prior Publication Data
US 2014/0325601 A1   Oct. 30, 2014

(51) Int. Cl.
*H04L 29/06* (2006.01)
*H04L 12/58* (2006.01)

(52) U.S. Cl.
CPC ............ *H04L 63/08* (2013.01); *H04L 51/00* (2013.01); *H04L 51/04* (2013.01); *H04L 63/101* (2013.01)

(58) Field of Classification Search
None
See application file for complete search history.

(56) References Cited

U.S. PATENT DOCUMENTS

| 7,832,003 | B2 | 11/2010 | Kelly et al. | |
| 7,930,731 | B2* | 4/2011 | Glasgow | 726/3 |
| 8,060,529 | B2 | 11/2011 | Hu et al. | |
| 2009/0043858 | A1* | 2/2009 | Park et al. | 709/206 |
| 2010/0250702 | A1 | 9/2010 | Wang et al. | |
| 2012/0298210 | A1* | 11/2012 | Pham et al. | 137/15.04 |

FOREIGN PATENT DOCUMENTS

| CN | 1928861 | 3/2007 |
| CN | 101175051 | 5/2008 |
| CN | 101194512 | 6/2008 |

OTHER PUBLICATIONS

International Search Report for International Application No. PCT/CN2013/074868, mailed Feb. 20, 2014, 2 pages.

* cited by examiner

*Primary Examiner* — Christopher Revak
(74) *Attorney, Agent, or Firm* — Blakely Sokoloff Taylor & Zafman LLP

(57) ABSTRACT

A computer-implemented method for managing private information in instant messaging is provided in accordance with an aspect of the present disclosure. In the method, first private information including details of a first instant messaging user is stored. Further, access authority of the first private information is maintained. When a second instant messaging user initiating a private information request has the access authority, provide the first private information to the second instant messaging user.

19 Claims, 10 Drawing Sheets

MANAGING PRIVATE INFORMATION IN INSTANT MESSAGING

CLAIM OF PRIORITY

This application is a U.S. National Phase application under 35 U.S.C. §371 of International Application No. PCT/CN2013/074868, filed Apr. 27, 2013, entitled "MANAGING PRIVATE INFORMATION IN INSTANT MESSAGING" the entire contents of which are incorporated herein by reference.

TECHNICAL FIELD

The present disclosure relates to instant messaging, and more particularly to manage private information in instant messaging.

BACKGROUND

Instant messaging (IM) is a form of communication over a network (such as the Internet) that offers quick transmission of messages from sender to receiver. In push mode between two or more people using personal computers (PCs), mobile phones, smart phones or other devices, instant messaging basically offers real-time or quasi real time direct written language-based online chat. It may address point-to-point communications as well as multicast communications from one sender to many receivers. More advanced instant messaging allows enhanced modes of communication, such as live voice or video calling, video chat and inclusion of hyperlinks to media.

Instant messaging application, such as Google Talk, Facebook Messenger, WhatsApp Messenger, LINE, KakaoTalk, and WeChat, can provide both text and voice communication. In addition to basic messaging, users can send each other images, video, audio media messages and make free Voice over Internet Protocol (VoIP) calls, and share diverse contents and information from photos, videos, voice messages, URL links to contact information. Both one-on-one chat and group chats are available over such as Wifi or 3G, and there are no limits to the number of friends to join in group chat. Instant messaging application lets users chat with friends on mobile, the main website or on a desktop computer. Instant messaging applications are cross-platform software. Some of the instant messaging applications are available for such as iOS, Microsoft Windows, Android, Blackberry, Bada OS, and Google Chrome OS (operating system).

WeChat, which can be literally called micro message, is a mobile phone text and voice messaging communication service developed by Tencent. The application was initially launched as Weixin, and re-branded as WeChat later. Clients are available for Android, iPhone, BlackBerry, Windows Phone, and Symbian platforms. WeChat is supported on such as WiFi, 2G, 3G, and 4G data networks. WeChat provides multimedia communication flexibility and convenience with text messaging, hold-to-talk voice messaging, broadcast (one-to-many) messaging, photo/video sharing, location sharing, and contact information exchange. User data can be protected via on-demand contact list backup and retrieval to/from a cloud-based service.

SUMMARY

In an aspect of the present disclosure, a computer-implemented method for managing private information in instant messaging is provided. The method includes: storing first private information, wherein the first private information comprises details of a first instant messaging user; maintaining access authority of the first private information; determining whether a second instant messaging user initiating a private information request has the access authority; and providing the first private information to the second instant messaging user when the second instant messaging user has the access authority.

In an aspect of the present disclosure, a system for managing private information in instant messaging is provided. The system includes: memory; one or more processors; and one or more programs stored in the memory and configured for execution by the one or more processors, the one or more programs including instructions to: store first private information, wherein the first private information comprises details of a first instant messaging user; maintain access authority of the first private information; determine whether a second instant messaging user initiating a private information request has the access authority; and provide the first private information to the second instant messaging user when the second instant messaging user has the access authority.

In an aspect of the present disclosure, a computer readable storage medium storing one or more programs configured to be executed by a computer system is provided. The one or more programs include instructions to: store first private information, wherein the first private information comprises details of a first instant messaging user; maintain access authority of the first private information; determine whether a second instant messaging user initiating a private information request has the access authority; and provide the first private information to the second instant messaging user when the second instant messaging user has the access authority.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

Instant messaging provides social networking service (SNS) for people around the world. During social activities, it is necessary to provide private information to others to make friends or build relationship with others. Nevertheless, private information may be real information recording details of an IM user. It is not suitable to release the private information directly to the public. As such, the present disclosure puts forward a scheme for managing private information in instant messaging to offer a sufficient and flexible protection on privacy of IM users.

Figure 1:
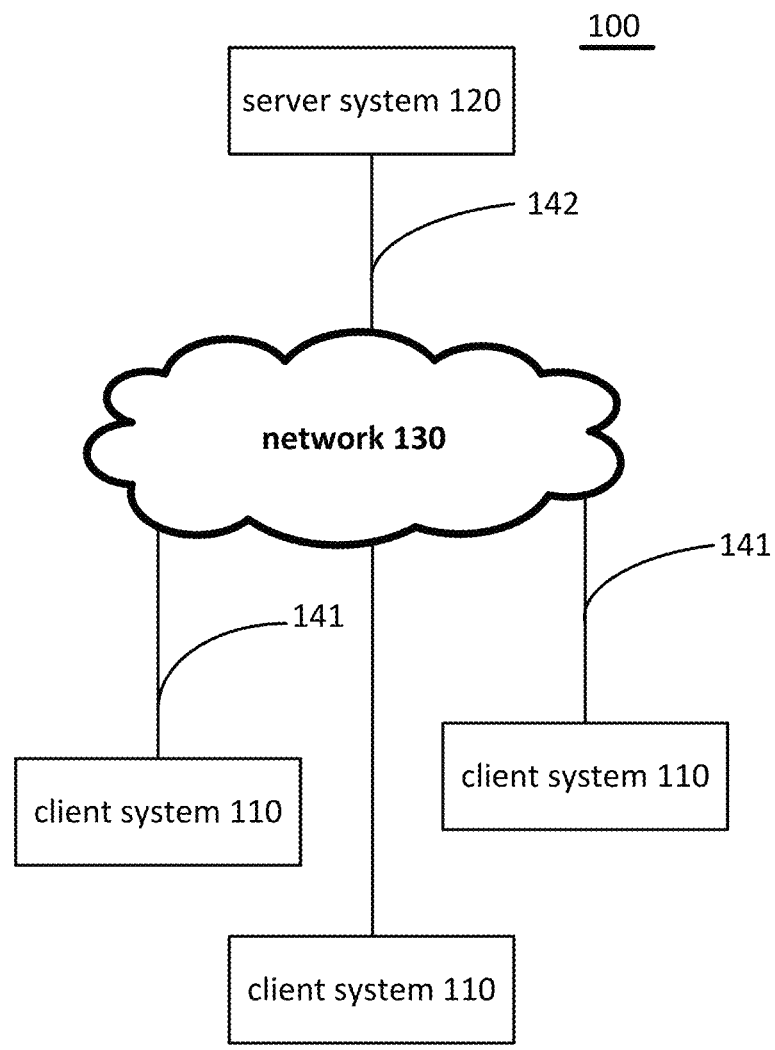
FIG. 1 is a block diagram illustrating a communications system 100 in accordance with an embodiment of the present disclosure.

Referring to FIG. 1, a communications system 100 is capable of delivering and exchanging data between multiple client systems 110, and a server system 120, such as an IM host, through a network 130. Specifically, the multiple client systems 110 access the network 130 via communications links 141, and the server system 120 accesses the network 130 via a communications link 142. The network 130 may be such as the Internet, other wide area networks, local area networks, metropolitan area networks, and so on. The communications links 141, 142 may be information transmission paths such as those provided by communication satellites, radio communications infrastructure and computer networks to connect two or more points. Such a communications system 100 may be available to users of IM service providers, such as, for example, Tencent QQ, Yahoo Messenger, Microsoft Messenger, WeChat, Facebook Messenger, and Google Talk.

The client system 110 may include communication software (e.g., an instant messaging client application) to enable users of the client system 110 to access the server system 120. In an example, the client system 110 may be a mobile device. The mobile device (also known as mobile communication terminal) may be a hand-held computing device including cell phones, laptops, smart phones, tablets, Personal Digital Assistant (PDA), and a telematics unit in vehicle (also called a car PC).

The server system 120 may support IM services irrespective of a user's network or Internet access. Thus, the server system 120 may allow users to send and receive instant messages, regardless of whether they have access to any particular Internet Service Provider (ISP). The server system 120 also may support associated services, such as administrative matters, advertising, directory services, chat, and interest groups related to instant messaging. The server system 120 has an architecture that enables devices (e.g., one or more servers) within the server system 120 to communicate with each other. In most common use, a server included in the server system 120 is a physical computer or a computer hardware system dedicated to run one or more computing services (as a host), to serve the needs of users of other nodes on a network. Depending on the computing services that it offers it could be an IM server, database server, file server, mail server, print server, web server, gaming server, or some other kind of server. To transfer data, the server system 120 employs one or more standard or exclusive IM protocols.

To access the server system 120 to begin an IM session in the implementation of FIG. 1, a client system 110 establishes a connection to the server system 120. Once a connection to the server system 120 has been established, the client system 110 may directly or indirectly transmit data to and access content from the server system 120. By accessing the server system 120, a first user can use the IM application to view whether particular users ("buddies") are on-line, exchange instant messages with particular buddies, participate in a group chat, trade files such as pictures, invitations or documents, find other buddies with similar interests, get customized information such as news and stock quotes, and search the Web.

In an implementation, instant messages sent between the client systems 110 are routed through the server system 120. In another implementation, instant messages sent between the client systems 110 are routed through a third party server (not shown in FIG. 1), and, in some cases, also are routed through the server system 120. In yet another implementation, instant messages are sent directly between the client systems 110.

Figure 2:
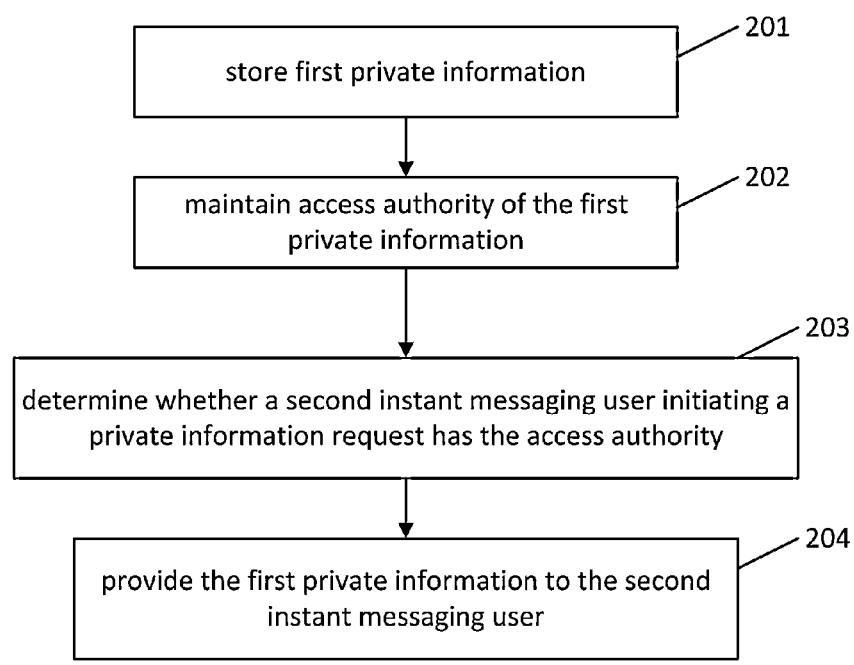
FIG. 2 is a flow diagram illustrating a method of managing private information for instant messaging according to an example of the present disclosure.

FIG. 2 is a flow diagram illustrating a method of managing private information for instant messaging according to an example of the present disclosure.

At block 201, a server stores first private information. The first private information includes details of a first instant messaging user. The first private information is input by the first instant messaging user via such as a mobile device (e.g., client system 110 in FIG. 1) and transmitted via the network 130 to the server 120. An IM user may edit or revise its private information wherever he/she wants, and each edition of the private information may be preserved into an IM server. At this time, although the private information is stored in the server, it is invisible to other IM users.

At block 202, the server maintains access authority of the first private information. In an example, the access authority is configured by the first IM user, thereby raising the security of private information.

At block 203, the server determines whether a second instant messaging user initiating a private information request has the access authority to the first private information. Typically, the server may perform determination after the private information request is received. Specifically, the server obtains from the request a first IM user identifier indicating whose private information is required, and a second IM user identifier indicating who requires the private information. The server searches its database for the first private information according to the first IM user identifier, and makes a determination according to the second IM user identifier together with the access authority it maintains.

At block 204, the server provides the first private information to the second instant messaging user when the second instant messaging user has the access authority.

Figure 3:
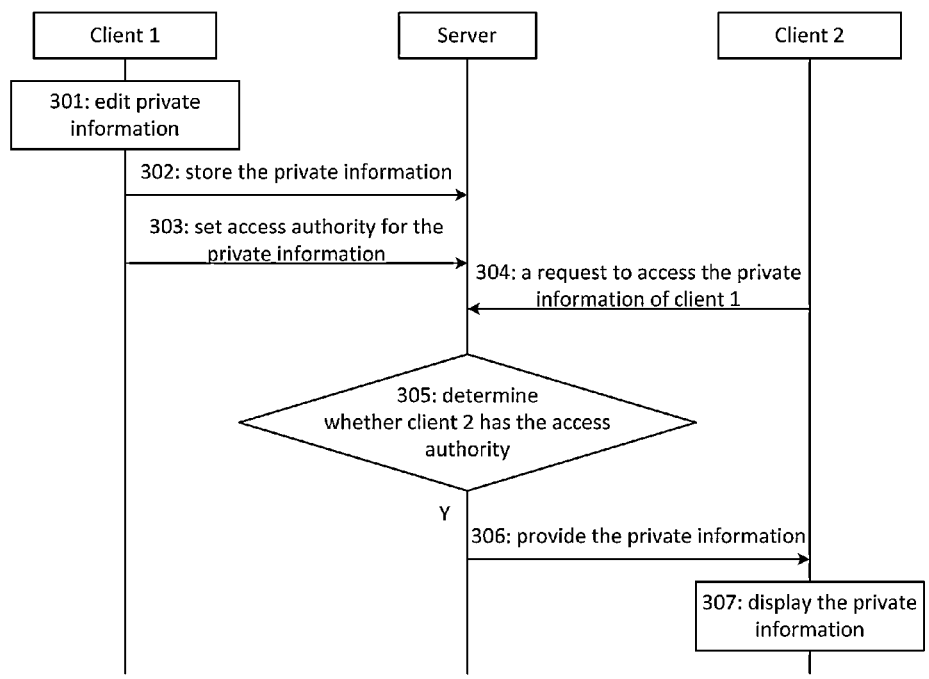
FIG. 3 shows an interaction among client 1, client 2, and a server for managing private information according to an embodiment of the present disclosure.

FIG. 3 shows an interaction among client 1, client 2, and a server for managing private information according to an embodiment of the present disclosure.

Client 1 edits (at block 301) private information, and stores (at block 302) the private information to the server. In an example, client 1 may set access authority of the private information at the same time when the private information is stored in the server. In another example, client 1 may set the access authority after the private information is stored in the server. For example, client 1 may input the private information when he/she registers an IM account, and set the access authority of the private information when he/she joins a group chat. Further, the private information may be divided into several information fields, and each information field is given an access authority. In an example, different access authorities are given to different information fields.

At block 304, client 2 sends a request to access the private information of client 1. In a scenario, client 2 knows that client 1 has provided its private information. At block 305, the server determines whether client 2 has the access authority. The server may provide the private information to client 2 when client 2 has the access authority at block 306. At block 307, the private information is displayed on a screen of client 2. If client 2 does not have the access authority, the server may deny the request of client 2. In an example, the server may inform client 2 that he/she is not entitled to access the private information of client 1. In another example, the server may not response to client 2 if he/she does not have the access authority.

Figure 4:
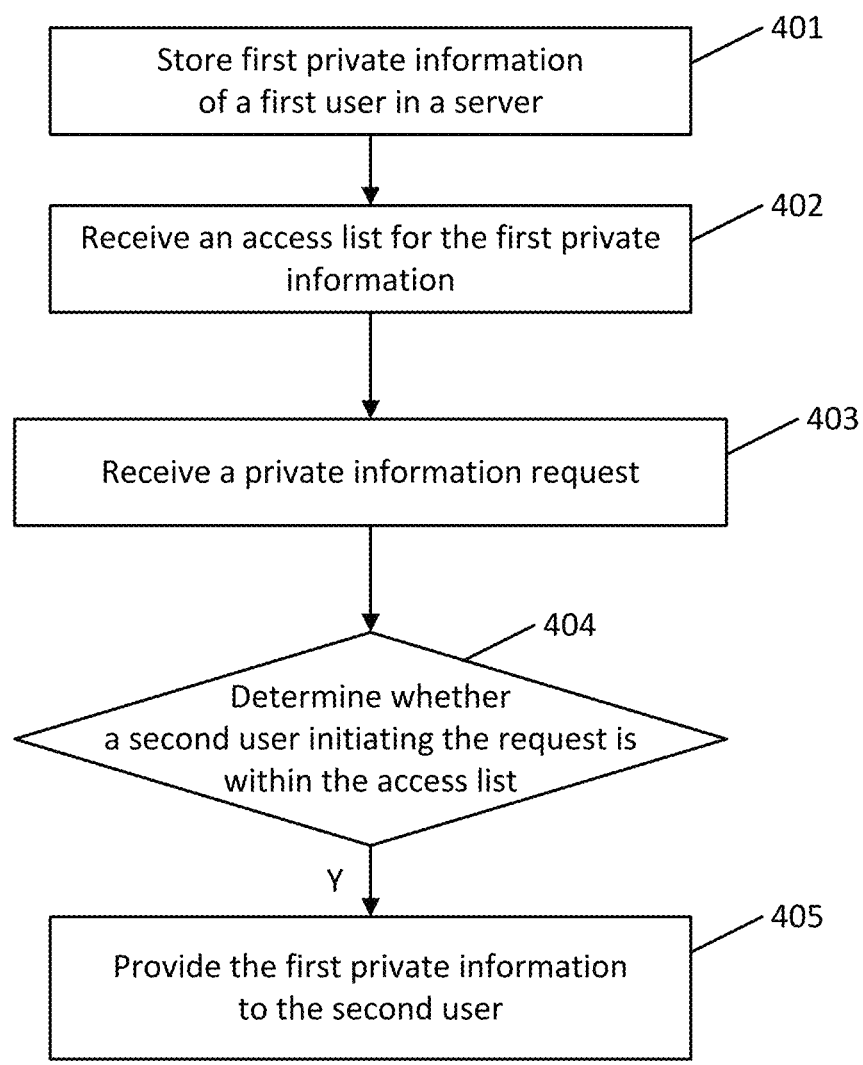
FIG. 4 is a flow diagram illustrating a method of managing private information for instant messaging according to an example of the present disclosure.

FIG. 4 is a flowchart illustrating a method of managing private information for instant messaging according to an embodiment of the present disclosure. In an example, the method is implemented by a server system 120 shown in FIG. 1.

At block 401, the server stores private information of a first user (hereinafter called private information for short). Specifically, the first user edits its private information in its client device and synchronously stores the private information into the server.

The private information is saved into a profile of the first user. The profile includes all kinds of information concerning the first user, such as basic account data, chat logs, etc. In an example, the private information records real information of the first user, e.g., real name, phone number, company name, company address, e-mail address.

In an example, the private information is presented in a form of electronic business card. An electronic business card is associated with an account of an instant messaging user. There may be a variety of designs applicable to the format or pattern of the electronic business card. In an example, the electronic business card may have the same style as a conventional business card. In another example, the electronic business card may be quite different from a conventional business card. In an example, the electronic business card is different from an electronic calling card already exists for recording dummy information of an instant messaging user, including WeChat name, avatar, etc.

In an example, an IM user can revise its private information when he/she wants, and each edition of the private information may be stored in the server with a corresponding time stamp for differentiating various private information editions. For example, user 1 may input its private information at time stamp A (e.g., 9:00 am), change the private information at time stamp B (e.g., 2:00 pm within the same day), and further update the private information at time stamp C (e.g., 6:00 am on a next day). It can be seen that the private information with time stamp C is the latest edition of user 1. The private information with time stamp A, the private information with time stamp B, and the private information with time stamp C are stored in the server as three separate pieces of records.

At block 402, the server maintains an access list for the private information. Members in the access list are allowable to obtain the private information. The access list is designated by the first user. In an example, the access list is the same as a contact list of the first user. That is, all the friends in the contact list may have an authority to see or obtain the private information.

At block 403, the serve receives a private information request initiated by a second user. In an example, the private information request contains user ID corresponding to the private information.

At block 404, when it is determined that the user ID indicates the first user, the server searches the profile of the first user to determine whether the second user is within the access list. If the second user is within the access list, that is, the second user has an access authority of the private information, the server provides (block 405) the private information to the second user.

In this case, those who are contained in the contact list (i.e., friends of the first user) have the chance to see the private information. IM users not contained in the contact list (i.e., strangers of the first user) are not able to get the private information.

Figure 5:
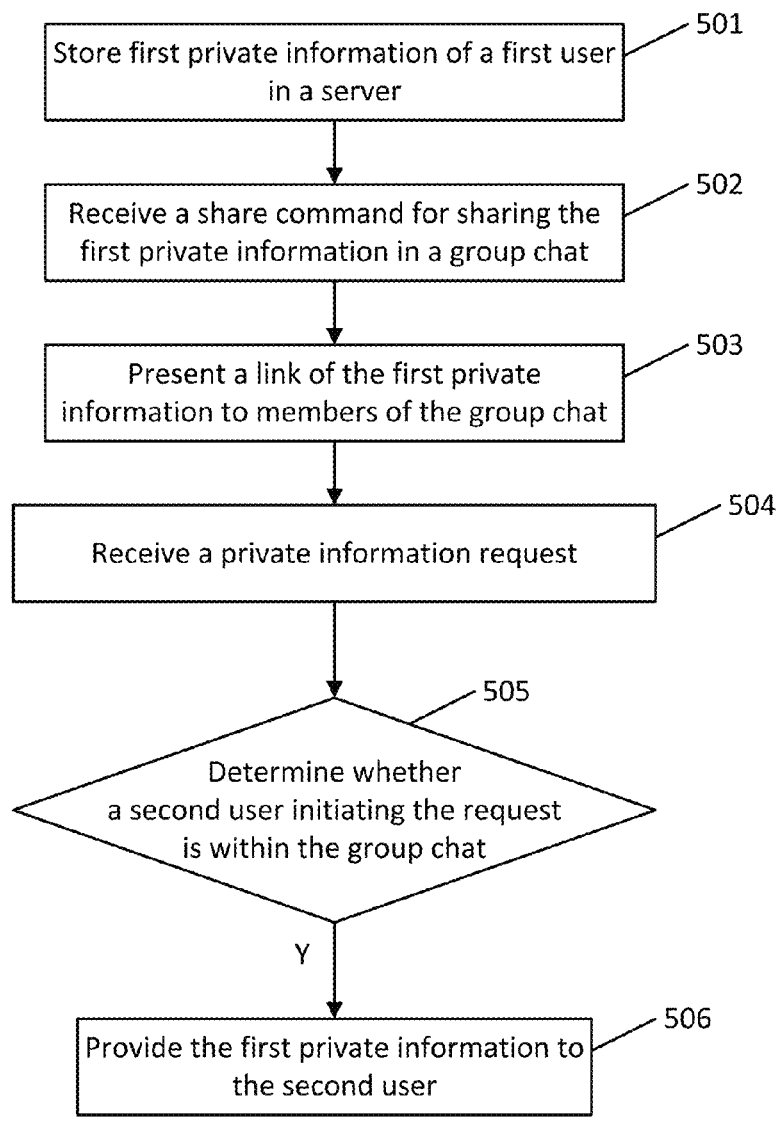
FIG. 5 is a flow diagram illustrating a method of managing private information for instant messaging according to an example of the present disclosure.

FIG. 5 is a flow diagram illustrating a method of managing private information for instant messaging according to an example of the present disclosure.

The operation of block 501 is the same as the operation of block 401 in FIG. 4. At block 502, the server receives a share command from the first user for sharing its private information. In an example, the first user may click a share button on the screen of its client device during a group chat (e.g., group chat 1) to send out the share command. The share command may include a user ID corresponding to the private information to indicate whose private information is to be shared, and a group chat ID to indicate which group chat is designated.

At block 503, the server presents a link of the private information to members of the designated group chat. In an example, since the first user has shared its private information for group chat 1, members of group chat 1 can see an icon representing the private information of the first user in a session interface of group chat 1.

At block 504, the server receives a private information request initiated by a second user who touches the link of the private information. The private information request may contain user ID corresponding to the private information to indicate whose private information is requested.

At block 505, the server determines whether the second user is within the designated group chat. If the second user is within the designated group chat, block 506 is executed. The second user within the designated group chat may be a friend of the first user, or a stranger of the first user.

In an example, if the second user is not within the designated group chat, the server may refuse the request of the second user. The server may further determine whether the second user has been a member of the designated group chat. In another example, when it is determined that the second user has been the member, the server may execute block 506. That is, even if the second user has exited from the designated group chat, he/she still has the right to obtain the private information. In yet another example, the server may further determine whether the second user is a friend of the first user although it is determined that the second user has been the member. In this case, the server may proceed to block 506 when it is determined that the second user is a friend of the first user ever been a member of the designated group chat. In an example, the second user may still be a member of the group chat, or already leave the group chat.

At block 506, the server provides the private information to the second user, which is similar to block 405 in FIG. 4.

Figure 6:
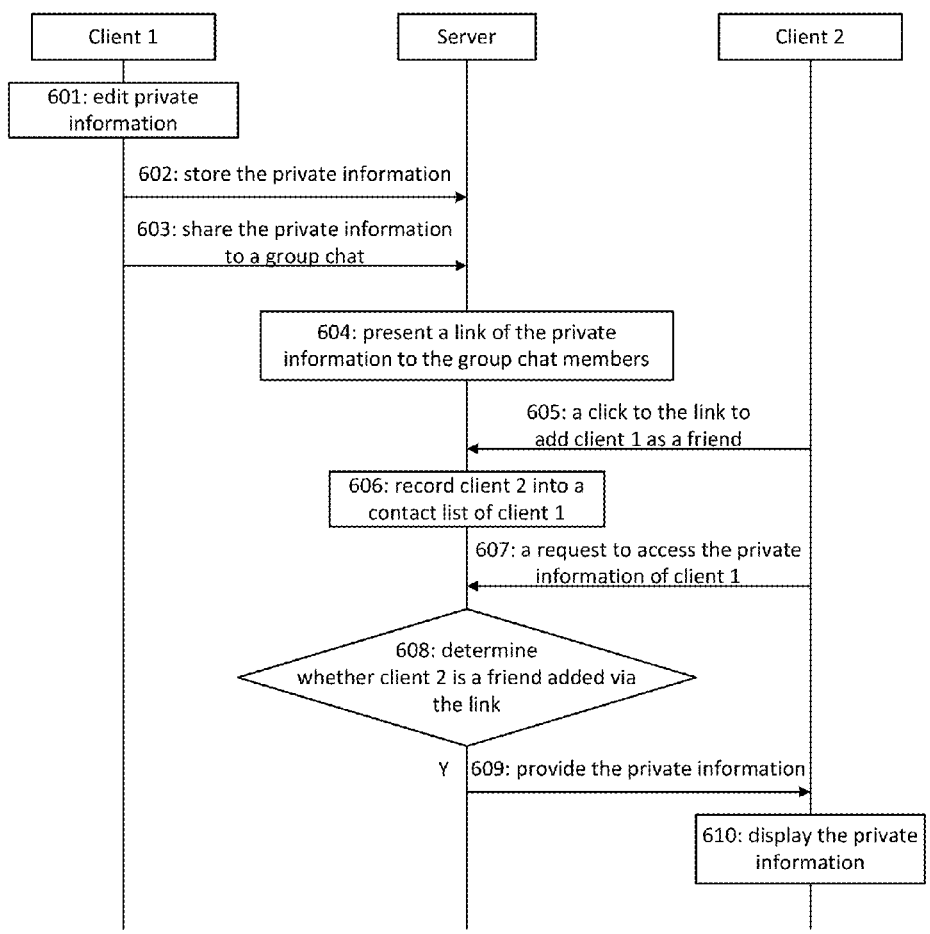
FIG. 6 is a flow diagram illustrating a method of managing private information for instant messaging according to an example of the present disclosure.

FIG. 6 is a flow diagram illustrating a method of managing private information for instant messaging according to an example of the present disclosure.

The operations of blocks 601-602 are the same as the operations of blocks 301-302 in FIG. 3, respectively. At block 603, client 1 shares the private information to a group chat (hereinafter called designated group chat). At block 604, the server presents a link of the private information to members of the designated group chat. At block 605, client 2 clicks the link to add client 1 as a friend. In this scenario, client 2 is a stranger of client 1 although client 2 is within the same group chat with client 1. At block 606, the server adds client 2 into a contact list of client 1, and records the way for adding friends (e.g., via a private information link). At block 607, client 2 sends a request to access the private information of client 1, and the server receives the request, accordingly. At block 608, instead of performing the operation described at block 505, the server may determine whether client 2 is a friend added via the link. If client 2 becomes a friend of client 1 via the private information link, the server may provide the private information to client 2 (block 609) without considering whether client 2 is within the designated group chat or not. Then, the private information is shown in client 2 at block 610.

In an implementation, a serer may receive a request for saving data to mobile device from the second user, and sends the first private information to the second user. Then, the first private information may be saved locally into an address list of the mobile device of the second user.

Figure 7:
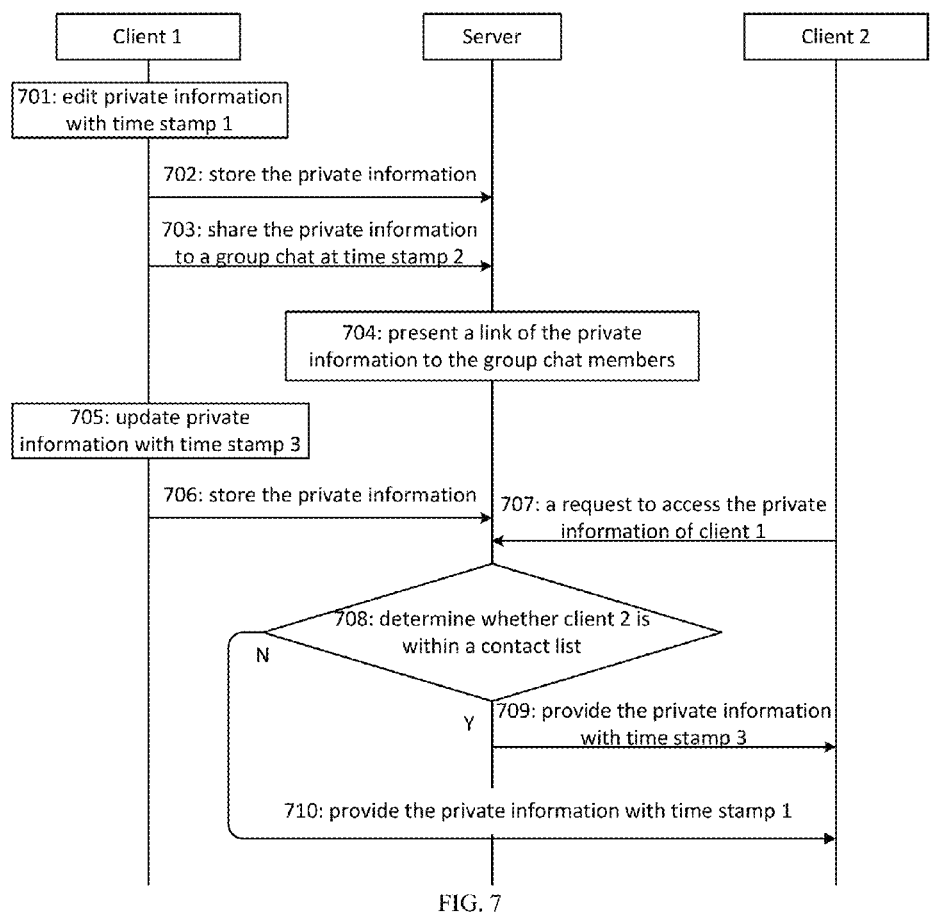
FIG. 7 is a flow diagram illustrating a method of managing private information for instant messaging according to an example of the present disclosure.

FIG. 7 is a flow diagram illustrating a method of managing private information for instant messaging according to an example of the present disclosure.

At block 701, client 1 edits private information having time stamp 1. At block 702, the private information with time stamp 1 is stored into a server. At block 703, client 1 shares the private information to a group chat. The share command carries time stamp 2. The operation of block 704 is the same as the operation of block 604 in FIG. 6. Client 1 updates its private information, and generates private information with time stamp 3 at block 705. At block 706, client 1 stores the private information with time stamp 3 into the server. At block 707, a request to access the private information of client 1 is raised by client 2. At block 708, the server determines whether client 2 is within a contact list of client 1. If yes, a latest edition of the private information (i.e., the private information with time stamp 3) is provided (block 709). If no, the shared edition of the private information (i.e., the private information with time stamp 1) is provided (block 710). In this way, different access authorities are given to friends and strangers, and a friend of an IM user is entitled to an access authority higher than a stranger. Therefore, the present disclosure will provide a comprehensive security protection to IM users in the network. Also, since private information is stored in a cloud-based server, all the friends either included in the access list or ever been a member of a designated group chat can have the latest edition of the private information when it is updated. Thus, client 1 does not need to inform his/her friends of private information change one by one, which facilitates private information exchange of IM users to a large extent.

In an implementation, the server may receive second private information scanned by the first instant messaging user. The second private information includes details of a third instant messaging user. In a scenario, the third IM user may show its private information (e.g., an electronic business card provided in an instant messaging application) to the first IM user when he/she meets the first IM user in an exhibition. The first IM user uses a scan function of an IM application to scan the second private information, and transmitted to the server. The server searches profile of the first instant messaging user to find an entry corresponding to the third instant messaging user, and stores the second private information into the entry corresponding to the third instant messaging user. In an example, an information field of the second private information (such as a phone number of the third IM user) can be used as an index for searching the profile of the first instant messaging user to find the corresponding entry. Specifically, an original scanned image of the second private information may be stored in the corresponding entry. If no corresponding entry can be found in the profile of the first instant messaging user, a new entry may be built for the second private information and recorded into the profile of the first IM user. As such, an easier way for private information exchange and storage is provided. Further, the first IM user may add one or more custom fields into the second private information to remark the third IM user. For example, the first IM user may use the company of the third IM user as a remark of the second private information, to help him/her recognize the identity of the third IM user later.

It should be noted that an instant messaging user in such as FIGS. 1-7 may refer to a person corresponding to an IM account and/or a client software resided in a mobile device or a computing device for instant messaging.

Figure 8:
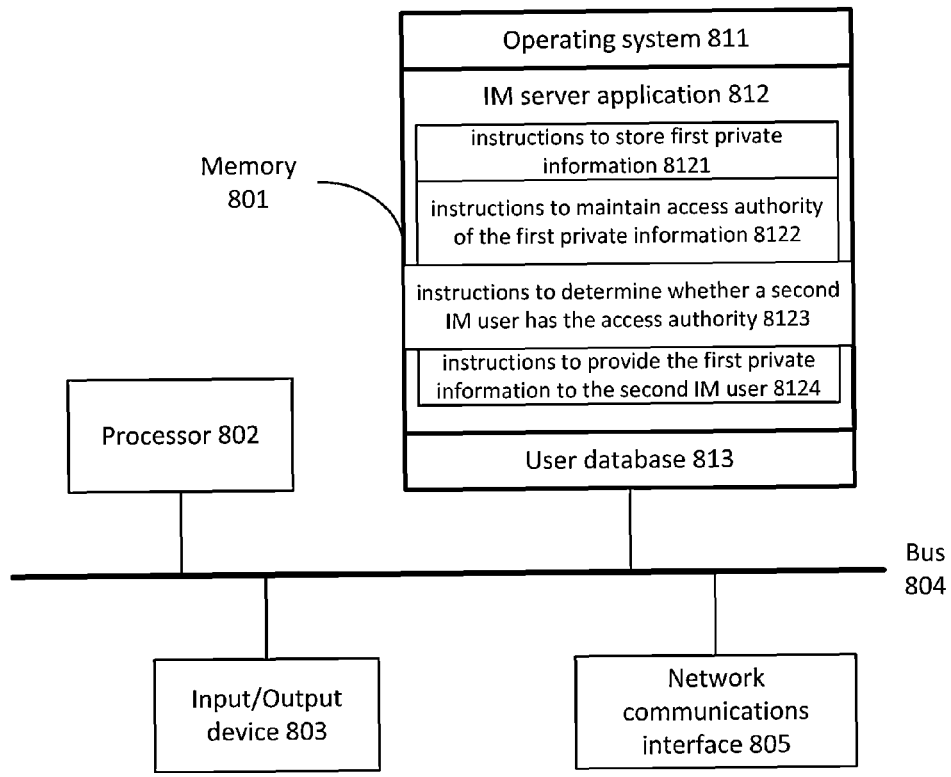
FIG. 8 is a block diagram illustrating a server system in accordance with an embodiment of the present disclosure.

FIG. 8 is a block diagram illustrating a server system in accordance with an embodiment of the present disclosure. The server system typically includes a memory 801, a processor 802, an input/output device 803, a bus 804, and a network communications interface 805. In an example, the server system may include multiple devices connected via such as an intranet or a bus, or the server system may be a device.

The memory 801 stores instructions for performing operations described in such as FIGS. 1-7. In an example, the memory 801 includes high-speed random access memory, such as DRAM, SRAM, DDR RAM or other random access solid state memory devices. In an example, the memory 801 may include non-volatile memory, such as one or more magnetic disk storage devices, optical disk storage devices, flash memory devices, or other non-volatile solid state storage devices. In an example, the memory 801 may optionally include one or more storage devices remotely located from the processor 802. Specifically, the memory 801 may include an operating system 811, IM server application 812 and user database 813. The operating system 811 includes procedures for handling various basic system services and for performing hardware dependent tasks. The user database 813 stores information such as profile of IM users. The IM server application 812 includes one or more programs for managing private information described in such as FIGS. 1-7. Specifically, the one or more programs include: instructions to store first private information 8121, instructions to maintain access authority of the first private information 8122, instructions to determine whether a second IM user has the access authority 8123, and instructions to provide the first private information to the second IM user 8124. The processor 802 executes the instructions stored in the memory 801.

Specifically, the one or more programs include: receive an access list sent from the first instant messaging user, wherein the access list records instant messaging users allowable to obtain the first private information; obtain a user identifier of the second instant messaging user; determine whether the user identifier of the second instant messaging user is within the access list; and when it is determined that the second instant messaging user is within the access list, decide that the second instant messaging user has the access authority.

Specifically, the one or more programs include: receive a share command from the first instant messaging user for sharing the first private information, wherein the share command comprises a group chat identifier for indicating the group chat in which the first private information is shared; and present a link of the first private information for one or more members of the group chat.

Specifically, the one or more programs include: determine whether the second instant messaging user is within the group chat in which the first private information is shared; and when it is determined that the second instant messaging user is within the group chat, decide that the second instant messaging user has the access authority.

Specifically, the one or more programs include: receive a friend adding request sent from the second instant messaging user via a click to the link of the first private information; record the second instant messaging user into a contact list of the first instant messaging user as a friend added via the first private information link; determine whether the second instant messaging user becomes a friend of the first instant messaging user via the first private information link after the private information request is received; and when it is determined that the second instant messaging user becomes a friend via the first private information link, decide that the second instant messaging user has the access authority.

Specifically, the one or more programs include: compare a time stamp contained in the share command with one or more time stamps of the first private information; when the first private information with a first time stamp later than the time stamp contained in the share command is available, provide the first private information with the first time stamp to a member of the group chat contained in the contact list of the first instant messaging user; and provide the first private information with a second time stamp no later than the time stamp contained in the share command to a member of the group chat not contained in the contact list of the first instant messaging user.

The input/output device 803 can be such as a keyboard, a mouse, or a display component such as a touch screen. The bus 804 is a subsystem that transfers data between components inside the server system. Specifically, the bus 804 can be parallel electrical wires with multiple connections, or any physical arrangement that provides the same logical functionality as a parallel electrical wire. Further, the bus 804 may include circuitry (sometimes called a chipset) that interconnects and controls communications between system components. The network communications interface 805 connects the server system into the network 130 shown in FIG. 1.

Figure 9:
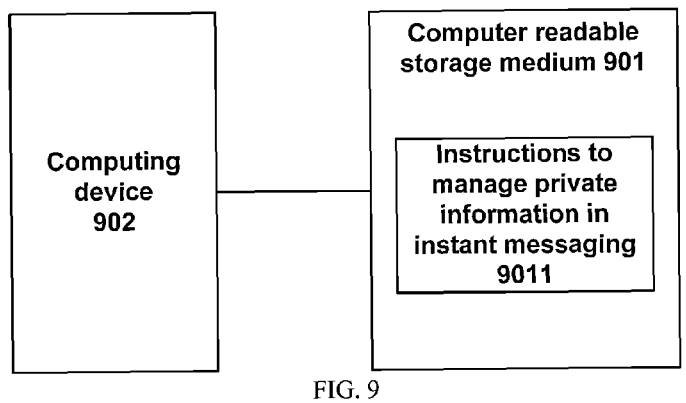
FIG. 9 is a block diagram illustrating computer readable storage medium for storing instructions to manage private information in instant messaging according to an embodiment of the present disclosure.

A computer readable storage medium containing instructions for execution by at least one processor is also presented in the present disclosure. FIG. 9 illustrates a computer readable storage medium 901 storing instructions to manage private information in instant messaging 9011. The instructions 9011 can be read by a computing device 902 to perform part or all of the operations described in such as FIGS. 1-8. Specifically, the instructions 9011 includes: instructions to store first private information 8121, instructions to maintain access authority of the first private information 8122, instructions to determine whether a second IM user has the access authority 8123, and instructions to provide the first private information to the second IM user 8124. In an example, the computer readable storage medium 901 may be one or more magnetic disk storage devices, flash memory devices, or other non-volatile solid state memory devices.

Figure 10:
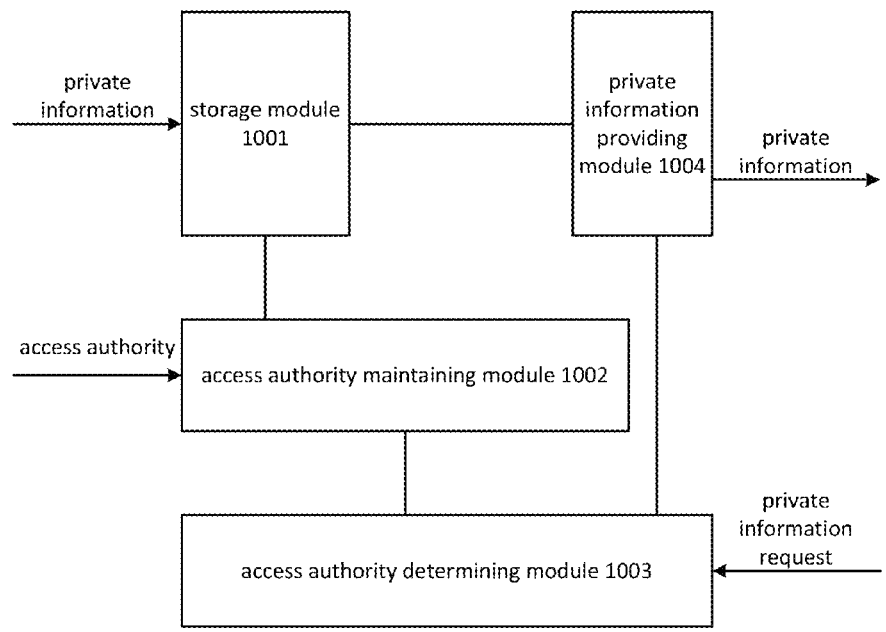
FIG. 10 is a block diagram illustrating a server system in accordance with an embodiment of the present disclosure.

FIG. 10 is a block diagram illustrating a server system in accordance with an embodiment of the present disclosure. The server system includes a storage module 1001, an access authority maintaining module 1002, an access authority determining module 1003, and a private information providing module 1004. Details of the operations of the modules are described in such as FIGS. 1-9. Specifically, the storage module 1001 stores private information provided by IM users. The access authority maintaining module 1002 receives access authority configuration from the IM users. The access authority determining module 1003 controls whether an IM user is capable of visiting a piece of private information after a private information request is received from the IM user. The private information providing module 1004 obtains the corresponding private information from the storage module 1001 after receiving an instruction from the access authority determining module 1003, and transmits the corresponding private information to the IM user initiating the request.

Figure 11:
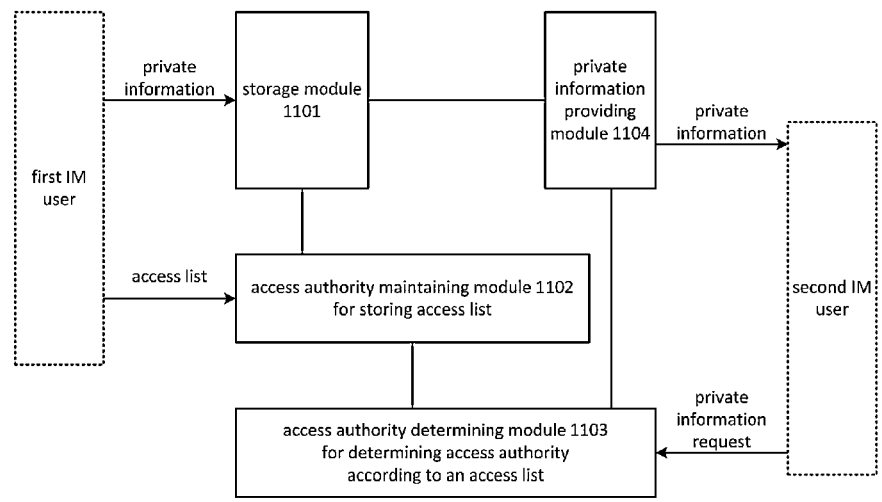
FIG. 11 is a block diagram illustrating a server system in accordance with an embodiment of the present disclosure.

FIG. 11 is a block diagram illustrating a server system in accordance with an embodiment of the present disclosure. The server system includes a storage module 1101, an access authority maintaining module 1102, an access authority determining module 1103, and a private information providing module 1104. Details of the operations of the modules are described in such as FIGS. 1-9. In an example, the storage module 1101 receives private information from a first IM user. The access authority maintaining module 1102 receives an access list from the first IM user, and stores the access list for the private information stored in the storage module 1101. The access authority determining module 1103 receives a private information request from a second IM user, and determines access authority according to the access list stored in the access authority maintaining module 1102. The private information providing module 1104 requests the storage module 1101 to provide the private information when a determination result of the access authority determining module 1103 is yes (i.e., the second IM user has the access authority). If the determination result is no, the private information providing module 1104 may not communicate with the storage module 1101 to get the private information. Therefore, the second IM user is not able to get the private information. Hence, security of private information is guaranteed.

Figure 12:
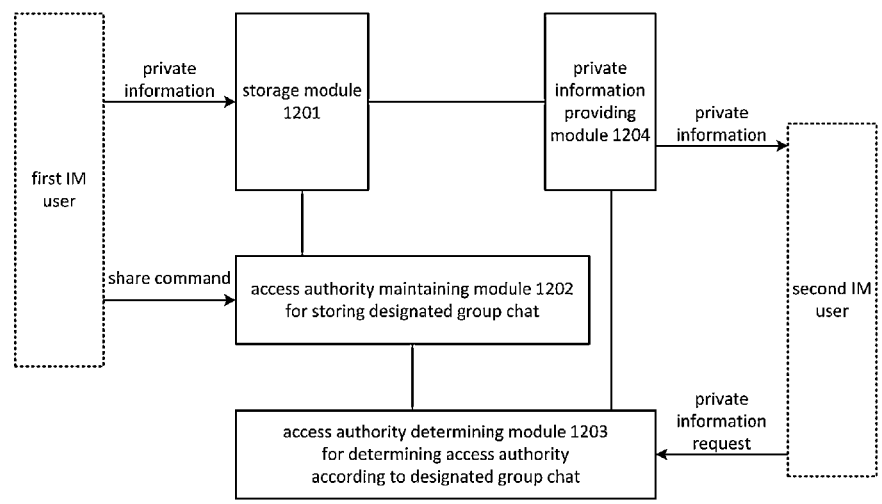
FIG. 12 is a block diagram illustrating a server system in accordance with an embodiment of the present disclosure.

FIG. 12 is a block diagram illustrating a server system in accordance with an embodiment of the present disclosure. The server system includes a storage module 1201, an access authority maintaining module 1202, an access authority determining module 1203, and a private information providing module 1204. Details of the operations of the modules can refer to such as FIGS. 1-11. The operations of the storage module 1201 and the private information providing module 1204 are the same as the operations of the storage module 1101 and the private information providing module 1104 in FIG. 11, respectively. The access authority maintaining module 1202 receives a share command from the first IM user, and records a designated group chat for the private information stored in the storage module 1201. The access authority determining module 1203 receives a private information request from a second IM user, and determines access authority according to the designated group chat stored in the access authority maintaining module 1202.

Figure 13:
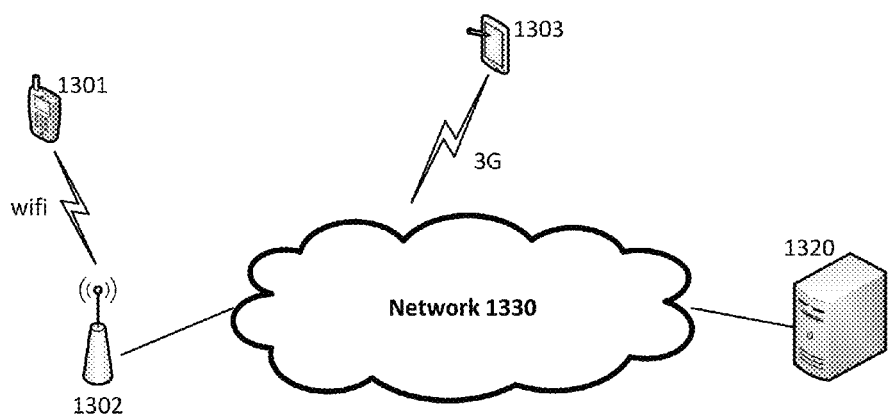
FIG. 13 shows a scenario for managing private information in WeChat platform according to an embodiment of the present disclosure.

FIG. 13 shows a scenario for managing private information in WeChat platform according to an embodiment of the present disclosure. A smartphone 1301 accesses a network 1330 via an access pint 1302. A tablet 1303 accesses the network 1330 over 3G. A WeChat server 1320 is provided for supporting such as instant messaging service for WeChat users. User A using the smartphone 1301 stores its WeChat business card into WeChat server 1320. After that, user B using the tablet 1303 initiates a private information request to WeChat server 1320. WeChat server 1320 performs operations described in such as FIGS. 1-12 to administrate access authority of private information. As such, WeChat provides a secure social networking platform for controlling private information exchange between WeChat users.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making a computing device implement the method recited in the examples of the present disclosure.

What is claimed is:

1. A computer-implemented method for managing private information in instant messaging, comprising:
    storing first private information, wherein the first private information comprises details of a first instant messaging user;
    maintaining access authority of the first private information;
    determining whether a second instant messaging user initiating a private information request has the access authority; and
    providing the first private information to the second instant messaging user when the second instant messaging user has the access authority;
    wherein
    maintaining the access authority of the first private information comprises:
    receiving a share command from the first instant messaging user for sharing the first private information, wherein the share command comprises a group chat identifier for indicating a group chat in which the first private information is shared;
    providing the first private information to the second instant messaging user comprises:
    comparing a time stamp contained in the share command with one or more time stamps of the first private information;
    when the first private information with a first time stamp later than the time stamp contained in the share command is available, providing the first private information with the first time stamp to a member of the group chat contained in the contact list of the first instant messaging user; and
    providing the first private information with a second time stamp no later than the time stamp contained in the share command to a member of the group chat not contained in the contact list of the first instant messaging user.

2. The method according to claim 1, wherein maintaining the access authority of the first private information comprises:
    receiving an access list sent from the first instant messaging user, wherein the access list records instant messaging users allowable to obtain the first private information.

3. The method according to claim 2, wherein determining whether the second instant messaging user has the access authority comprises:
    obtaining a user identifier of the second instant messaging user;
    determining whether the user identifier of the second instant messaging user is within the access list; and
    when it is determined that the second instant messaging user is within the access list, deciding that the second instant messaging user has the access authority.

4. The method according to claim 1, wherein maintaining the access authority of the first private information comprises:
    presenting a link of the first private information for one or more members of the group chat.

5. The method according to claim 4, wherein determining whether the second instant messaging user has the access authority comprises:
    determining whether the second instant messaging user is within the group chat in which the first private information is shared; and
    when it is determined that the second instant messaging user is within the group chat, deciding that the second instant messaging user has the access authority.

6. The method according to claim 4, further comprising:
    receiving a friend adding request sent from the second instant messaging user via a click to the link of the first private information;
    recording the second instant messaging user into a contact list of the first instant messaging user as a friend added via the first private information link; and
    determining whether the second instant messaging user has the access authority comprises:
    determining whether the second instant messaging user becomes a friend of the first instant messaging user via the first private information link; and
    when it is determined that the second instant messaging user becomes a friend via the first private information link, deciding that the second instant messaging user has the access authority.

7. The method according to claim 1, wherein providing the first private information to the second instant messaging user comprises:
    sending the first private information to the second instant messaging user when a request for saving data to mobile device is received, wherein the first private information is stored into an address list of the mobile device of the second instant messaging user.

8. The method according to claim 1, further comprising:
    receiving second private information scanned by the first instant messaging user, wherein the second private information comprises details of a third instant messaging user;

searching profile of the first instant messaging user to find an entry corresponding to the third instant messaging user; and storing the second private information into the entry corresponding to the third instant messaging user.

9. The method according to claim 1, wherein the first private information is stored in a form of an electronic business card.

10. A system for managing private information in instant messaging, comprising:

memory;

one or more processors; and one or more programs stored in the memory and configured for execution by the one or more processors, the one or more programs including instructions to:

store first private information, wherein the first private information comprises details of a first instant messaging user;

maintain access authority of the first private information;

determine whether a second instant messaging user initiating a private information request has the access authority; provide the first private information to the second instant messaging user when the second instant messaging user has the access authority;

wherein the one or more programs including instructions to maintain the access authority of the first private information include instructions to:

receive a share command from the first instant messaging user for sharing the first private information, wherein the share command comprises a group chat identifier for indicating a group chat in which the first private information is shared; and the one or more programs including instructions to provide the first private information to the second instant messaging user include instructions to:

compare a time stamp contained in the share command with one or more time stamps of the first private information;

when the first private information with a first time stamp later than the time stamp contained in the share command is available, provide the first private information with the first time stamp to a member of the group chat contained in the contact list of the first instant messaging user; and provide the first private information with a second time stamp no later than the time stamp contained in the share command to a member of the group chat not contained in the contact list of the first instant messaging user.

11. The system according to claim 10, wherein the one or more programs include instructions to:

receive an access list sent from the first instant messaging user, wherein the access list records instant messaging users allowable to obtain the first private information;

obtain a user identifier of the second instant messaging user;

determine whether the user identifier of the second instant messaging user is within the access list; and when it is determined that the second instant messaging user is within the access list, decide that the second instant messaging user has the access authority.

12. The system according to claim 10, wherein the one or more programs include instructions to:

present a link of the first private information for one or more members of the group chat.

13. The system according to claim 12, wherein the one or more programs include instructions to:

determine whether the second instant messaging user is within the group chat in which the first private information is shared; and when it is determined that the second instant messaging user is within the group chat, decide that the second instant messaging user has the access authority.

14. The system according to claim 12, wherein the one or more programs include instructions to:

receive a friend adding request sent from the second instant messaging user via a click to the link of the first private information;

record the second instant messaging user into a contact list of the first instant messaging user as a friend added via the first private information link;

determine whether the second instant messaging user becomes a friend of the first instant messaging user via the first private information link after the private information request is received; and when it is determined that the second instant messaging user becomes a friend via the first private information link, decide that the second instant messaging user has the access authority.

15. A non-transitory computer readable storage medium storing one or more programs configured to be executed by a computer system, the one or more programs comprising instructions to:

store first private information, wherein the first private information comprises details of a first instant messaging user;

maintain access authority of the first private information;

determine whether a second instant messaging user initiating a private information request has the access authority; and provide the first private information to the second instant messaging user when the second instant messaging user has the access authority;

wherein the one or more programs including instructions to maintain the access authority of the first private information includes instructions to:

receive a share command from the first instant messaging user for sharing the first private information, wherein the share command comprises a group chat identifier for indicating a group chat in which the first private information is shared; and the one or more programs including instructions to provide the first private information to the second instant messaging user include instructions to:

compare a time stamp contained in the share command with one or more time stamps of the first private information;

when the first private information with a first time stamp later than the time stamp contained in the share command is available, provide the first private information with the first time stamp to a member of the group chat contained in the contact list of the first instant messaging user; and provide the first private information with a second time stamp no later than the time stamp contained in the share command to a member of the group chat not contained in the contact list of the first instant messaging user.

16. The non-transitory computer readable storage medium according to claim 15, wherein the one or more programs include instructions to:

receive an access list sent from the first instant messaging user, wherein the access list records instant messaging users allowable to obtain the first private information;

obtain a user identifier of the second instant messaging user;

determine whether the user identifier of the second instant messaging user is within the access list; and when it is determined that the second instant messaging user is within the access list, decide that the second instant messaging user has the access authority.

17. The non-transitory computer readable storage medium according to claim 15, wherein the one or more programs include instructions to:

present a link of the first private information for one or more members of the group chat.

18. The non-transitory computer readable storage medium according to claim 17, wherein the one or more programs include instructions to:

determine whether the second instant messaging user is within the group chat in which the first private information is shared; and when it is determined that the second instant messaging user is within the group chat, decide that the second instant messaging user has the access authority.

19. The non-transitory computer readable storage medium according to claim 17, wherein the one or more programs include instructions to:

receive a friend adding request sent from the second instant messaging user via a click to the link of the first private information;

record the second instant messaging user into a contact list of the first instant messaging user as a friend added via the first private information link;

determine whether the second instant messaging user becomes a friend of the first instant messaging user via the first private information link after the private information request is received; and when it is determined that the second instant messaging user becomes a friend via the first private information link, decide that the second instant messaging user has the access authority.

* * * * *